United States Patent [19]

Zimmerman

[11] Patent Number: 4,783,171

[45] Date of Patent: Nov. 8, 1988

[54] LOADING CONVEYOR FOR CONCRETE MIXER

[76] Inventor: Harold M. Zimmerman, R.D. #1, Wabash Rd., Ephrata, Pa. 17522

[21] Appl. No.: 866,274

[22] Filed: May 23, 1986

[51] Int. Cl.[4] ........................ B28C 7/06; B65G 17/06; B65G 17/26; B60P 1/36

[52] U.S. Cl. ........................................ 366/37; 198/313; 198/370; 198/734; 366/27; 366/50; 414/343; 414/528

[58] Field of Search ........................ 366/16, 17, 19, 26, 366/33, 34, 37, 42, 50, 27; 198/313, 318, 370, 734, 735, 530, 366; 414/271, 272, 340, 343, 345, 346, 527, 528, 574, 573, 679, 269, 584, 376, 401, 373

[56] References Cited

U.S. PATENT DOCUMENTS

| | | | |
|---|---|---|---|
| 979,778 | 12/1910 | Malloy | 366/33 X |
| 2,776,741 | 1/1957 | Carrier, Jr. | 198/370 |
| 2,948,519 | 8/1960 | Bradshaw, Jr. et al. | 366/16 |
| 3,067,858 | 12/1962 | Loosli | 198/313 X |
| 3,351,180 | 11/1967 | Herzog et al. | 198/370 |
| 3,746,313 | 7/1973 | Weeks et al. | 366/19 |
| 3,750,802 | 8/1973 | Holland | 414/345 |
| 3,791,511 | 2/1974 | Holland | 198/735 X |
| 3,828,919 | 8/1974 | Holtsclaw et al. | 198/370 X |
| 4,023,673 | 5/1977 | Hansen | 198/370 X |
| 4,051,948 | 10/1977 | Sackett, Sr. | 198/735 X |
| 4,199,054 | 4/1980 | Wirsbinski | 198/735 |
| 4,426,185 | 1/1984 | Wheeler et al. | 414/196 |
| 4,471,868 | 9/1984 | Buschbom et al. | 198/735 |
| 4,538,916 | 9/1985 | Zimmerman | 366/40 |

*Primary Examiner*—Harvey C. Hornsby
*Assistant Examiner*—Scott J. Haugland
*Attorney, Agent, or Firm*—Larry W. Miller

[57] ABSTRACT

A loading conveyor for a mobile concrete mixing machine is disclosed wherein the conveyor is provided with a receiving hopper for receiving a supply of material from an external source of supply. The chain and slat conveyor is provided with an elevating portion that conveys the material from the hopper to a delivery portion which permits selective delivery to one of two aggregate supply bins. The floor of the conveyor is disposed between an upper delivery run and a lower return run and is provided with a movable section actuated by hydraulic cylinders to selectively create an opening in the floor over one or the other of the aggregate supply bins. The return run is operable to redistribute piled material within the supply bin during operation of the conveyor. The loading conveyor is operable to receive supplies of different aggregates from external sources of supply while the concrete producing machine is in motion along a path of travel to permit a continuous production and depositing of concrete therefrom along the path of travel.

19 Claims, 2 Drawing Sheets

LOADING CONVEYOR FOR CONCRETE MIXER

BACKGROUND OF THE INVENTION

The present invention relates generally to mobile concrete producing machines that mix and produce concrete on site from component materials carried by the machine and, more particularly, to a loading conveyor for utilization on such machines to permit the loading of component materials used for the production of concrete into supply lines forming a part of the machine during the mobile operation thereof.

Mobile concrete mixers of the type seen in U.S. Pat. No. 4,538,916, issued to H. M. Zimmerman, on Sept. 3, 1985, carry discrete quantities of the various materials and components used to produce concrete. Such concrete mixing units have been marketed under the trademark ZIM-MIXER and includes hoppers containing sand, a course aggregate, cement and water. These materials are combined in a desirable proportion by a metering and conveying mechanism that delivers the material into a mixing auger operable to combine the materials and produce the desired amount of concrete. Such concrete mixers are limited in the amount of concrete that can be produced on a continuous basis because of the limited supply of materials carried within the supply bins.

To permit the continuous operation of a mobile concrete production machine along a path of travel, it is necessary to replenish the supply of aggregates, as well as the other component materials, such as cement and water, within the supply bins forming a part of the machine. Furthermore, because of the large volume of concrete expected to be produced by a large continuous version of such concrete production machines, it is necessary to provide a loading conveyor that would be operable to receive whole truckloads of aggregate, both sand and course aggregate, for delivery to the appropriate supply bin. It should be desirable to use the same loading conveyor to load more than one type of aggregate. Accordingly, the conveyor must be selectively operable to deliver at least a second type of aggregate to a second supply bin. To enable the concrete production machine to operate in a continuous manner by moving along the path of travel depositing concrete rearwardly thereof, it is necessary to provide such an aggregate loading mechanism to permit receipt of component supplies for the production of concrete while the machine is in motion along its path of travel.

SUMMARY OF THE INVENTION

It is an object of this invention to provide a loading conveyor for a concrete production machine that is operable to receive and load aggregate from an external source of supply into the supply bins of the machine while the machine is in motion.

It is another object of this invention to pivotally mount both the elevating portion of the loading conveyor and the delivery portion of the loading conveyor about a pivot shaft to permit generally vertical movement of the respective portions of the conveyor relative to the concrete production machine.

It is a feature of this invention that the delivery portion of the loading conveyor can be raised relative to the concrete production machine to permit a piling of the aggregate being loaded into the supply bins above the upper level of the supply bin.

It is an advantage of this invention that the receiving hopper of the loading conveyor is integrally formed with the elevating portion thereof and pivotally movable with the elevating portion about the pivot shaft.

It is another feature of this invention that the receiving hopper of the loading conveyor can be movably positioned relative to the concrete production machine to properly locate the hopper relative to a truck delivering a supply of aggregate thereto.

It is still another object of this invention to provide the hopper with a roller engageable with the truck delivering a supply of aggregate to the concrete production machine to facilitate the forward movement of the truck with the machine during the mobile operation of the machine.

It is another advantage of this invention that the roller mounted on the receiving hopper can be positioned against the tires of the delivery truck to permit the concrete production machine to push the delivery truck forwardly as the machine is advancing along its path of travel and while the delivery truck is unloading aggregate into the receiving hopper.

It is still another object of this invention to provide a mechanism in the delivery portion of the loading conveyor to selectively permit a discharge of aggregate from the loading conveyor into any one of at least two aggregate supply bins.

It is still another feature of this invention that a movable section of the conveyor floor can be shifted to form an opening over a selected one of two aggregate supply bins to permit discharge of aggregate from the conveyor to the selected supply bin.

It is still another advantage of this invention that a single loading conveyor can be utilized to receive at least two different types of aggregates used as component material for the production of concrete and selectively discharge the aggregate into the appropriate one of at least two aggregate supply bins.

It is yet another feature of this invention that the floor of the loading conveyor is disposed between an upper delivery run and a lower return run of the conveyor to permit the chain and slat conveyor to be cooperable therewith for the conveying of aggregate material from the receiving hopper to the point of discharge into the appropriate supply bin.

It is yet another advantage of this invention that the return run of the loading conveyor will engage piled materials positioned within the respective supply bins and distribute the piled material within the respective supply bin during operation of the loading conveyor.

It is a further object of this invention to provide a loading conveyor for a mobile concrete production machine that is capable of receiving supplies of component materials for the production of concrete while the machine is in motion along a path of travel and while the machine is in the process of continuously producing concrete and discharging the produced concrete rearwardly of the machine.

It is still a further object of this invention to provide a loading conveyor for a mobile concrete machine which is durable in construction, inexpensive of manufacture, carefree of maintenance, facile in assemblage, and simple and effective in use.

These and other objects, features and advantages are accomplished according to the instant invention by providing a loading conveyor for a mobile concrete mixing machine wherein the conveyor is provided with a receiving hopper for receiving a supply of material from an external source of supply. The chain and slat conveyor is provided with an elevating portion that conveys the material from the hopper to a delivery portion which permits selective delivery to one of two aggregate supply bins. The floor of the conveyor is disposed between an upper delivery run and a lower return run and is provided with a movable section actuated by hydraulic cylinders to selectively create an opening in the floor over one or the other of the aggregate supply bins. The return run is operable to redistribute piled material within the supply bin during operation of the conveyor. The loading conveyor is operable to receive supplies of different aggregates from external sources of supply while the concrete producing machine is in motion along a path of travel to permit a continuous production and depositing of concrete therefrom along the path of travel.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figures 1, 2:
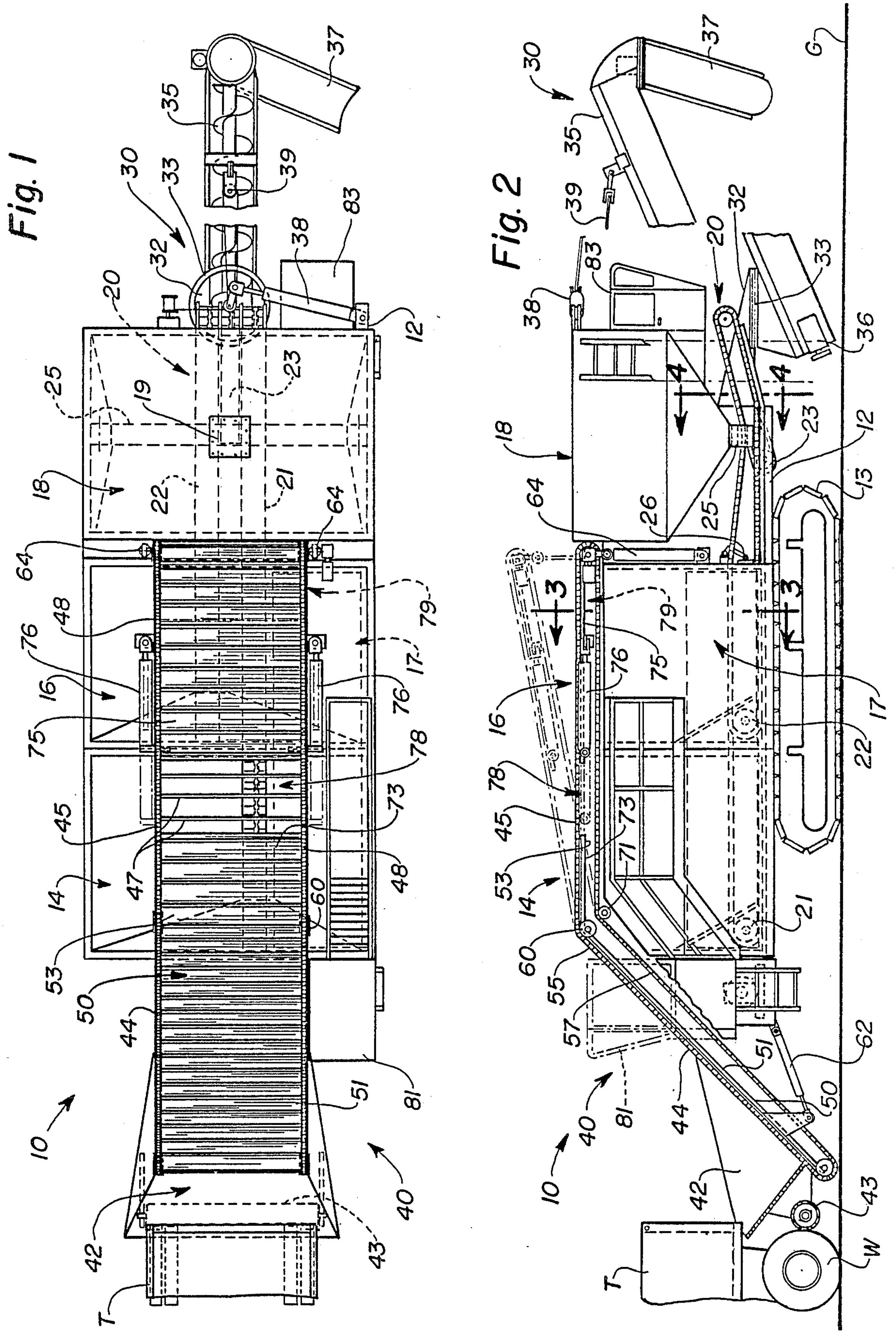
FIG. 1 is a top plan view of the mobile concrete production machine having a loading conveyor mounted thereon and a mixing auger extending rearwardly therefrom, portions of the mixing auger being broken away, and incorporating the principles of the instant invention.
FIG. 2 is a left side elevational view of the mobile concrete production machine seen in FIG. 1 with a delivery truck being positioned adjacent the receiving hopper of the loading conveyor, portions of the mixing auger and the front operator's station being broken away to more clearly show the various components of the machine, the pivotal movement of the delivery portion of the loading conveyor being shown in phantom.

Referring now to the drawings and, more particularly, to FIGS. 1 and 2, top plan and left side elevational views of the mobile concrete production machine incorporating the principles of the instant invention can be seen. Any left and right references are used as a matter of convenience and are determined by standing at the rear of the machine from which the mixing auger extends, facing the forward end on which is mounted the receiving hopper of the loading conveyor, which is the normal direction of travel of the machine.

Figure 3:
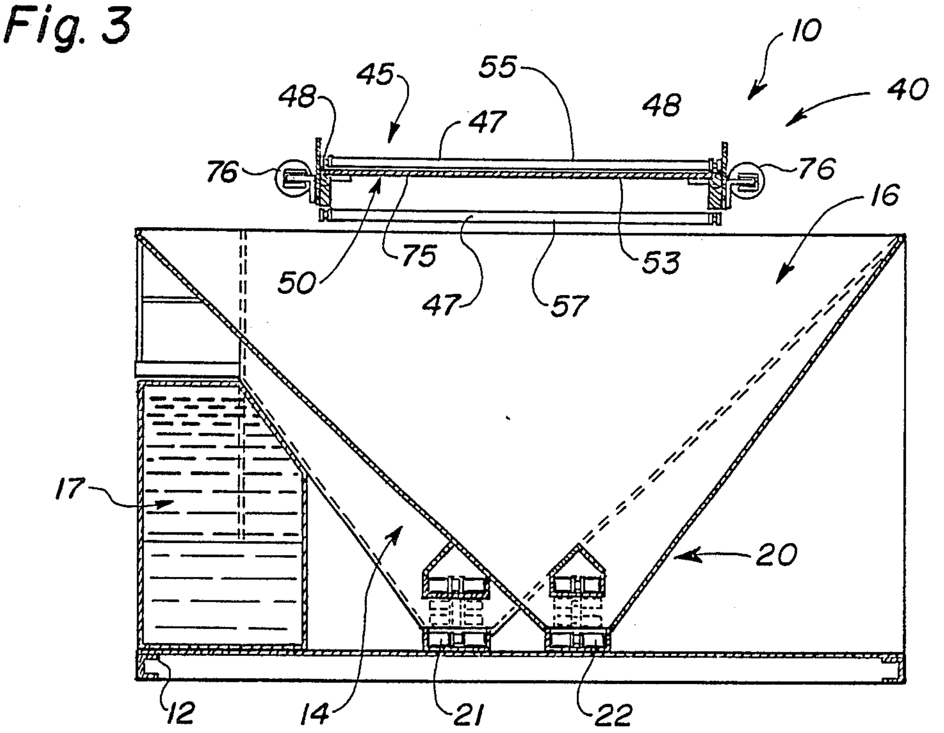
FIG. 3 is an enlarged partial cross-sectional view of the mobile concrete production machine taken along lines 3-3 of FIG. 2 through the rearwardmost aggregate supply bin, the delivery portion of the loading conveyor being shown in its lowermost position.
Figure 4:
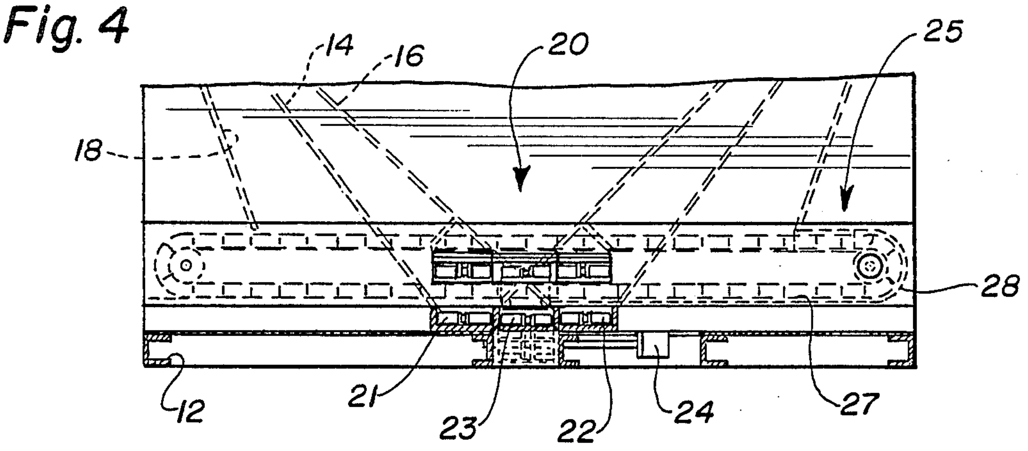
FIG. 4 is an enlarged partial cross-sectional view of the mobile concrete production machine taken along lines 4-4 of FIG. 2 to show the metering mechanism of the cement supply bin and the relative positions of the delivery conveyors bringing materials from the component supply bins to the hopper for the mixing auger.

The concrete production machine 10 is provided with a frame 12 mobilely supported over the ground G by a pair of conventional tracks 13, or alternatively a plurality of wheeled axles sufficient to support the weight of the machine 10, which permits the machine 10 to be mobilely moved over the ground G along a path of travel. The frame 12 supports above the tracks 13 a first aggregate supply bin 14, an adjacent second aggregate supply bin 16, a water tank 17, which is tucked underneath and adjacent to the aggregate supply bins 14,16 (as is better seen in FIG. 3), a cement supply bin 18 positioned rearwardly of the aggregate supply bins 14,16 and being equipped with an access mechanism 19 to permit a blowing of cement into the cement supply bin 18 in a conventional manner. These individual supply bins and/or tank contain discrete amounts of the component materials utilized in the production of concrete by the machine 10 and have sloped sides to facilitate the continuous flow of material therewithin to a delivery conveyor mechanism 20.

As best seen in FIGS. 1-4, the concrete production machine 10 is also provided with a delivery conveyor mechanism 20 which includes a first drag conveyor 21 in operable communication with the first aggregate supply bin 14 to convey aggregate therefrom, a second drag conveyor 22 in operable communication with the second aggregate supply bin 16 to convey aggregate therefrom and a third drag conveyor 23 cooperable with a metering mechanism 25 housed in the bottom of the cement bin 18 to convey discrete amounts of cement therefrom.

Each drag conveyor 21,22,23 is individually driven by a separate drive mechanism exemplarily shown by the hydraulic motor 24 operatively driving the third drag conveyor 23. As is described in greater detail in U.S. Pat. No. 4,538,916, issued to Harold M. Zimmerman on Sep. 3, 1985, the description of which is incorporated herein by reference, the metering mechanism 25 includes a transverse paddle conveyor 27 mounted within a housing 28 to prevent the cement from flowing from the supply bin 18 in an unmetered fashion into the third drag conveyor 23. By regulating the various speeds of the drag conveyors 21,22,23, as well as the paddle conveyor 27, and the volume of material carried between the respective blades of these conveyors, which can also be regulated in a conventional manner by the movable shuttle 26, the amounts of individual materials being conveyed thereby during any given increment of time can be determined and regulated as needed to produce concrete having the desired characteristics.

The delivery conveyor mechanism 20 discharges the materials therefrom into a mixing mechanism 30. The mixing mechanism 30 includes a hopper 32 for receiving the materials discharged from the drag conveyors 21,22,23 and is provided with an upper annular ring 33 to permit a pivoting of the mixing mechanism 30 for purposes to be described in greater detail below. The mixing mechanism 30 also includes a mixing auger 35 operably powered by a hydraulic motor 36 to mix the aggregates and cement received within the hopper 32 from the delivery conveyor mechanism 20 with water from the water tanks 17 through hoses (not shown) and with optional additive admixtures and chemicals in a conventional manner to produce concrete therefrom. Operation of the mixing mechanism 30 is described in greater detail in the aforementioned U.S. Pat. No. 4,538,916, and the related applications noted therein.

The mixing auger 35 empties the concrete produced therein into a discharge chute 37 which in turn directs the concrete toward the ground G. The horizontal pivoted position of the mixing auger 35 and discharge chute 37 about the annular ring 35, as well as the vertical positioning of the mixing auger 35 is controlled and regulated through operation of a hydraulic cylinder 38 and a cable control mechanism 39 in a known manner to permit the discharge of concrete to the ground G in a side-to-side manner rearwardly of the machine 10.

As best seen in FIGS. 1 and 2, a loading conveyor extends forwardly of the concrete production machine and above the aggregate supply bins 14,16. The loading conveyor 40 is provided with a receiving hopper 42 appropriately positionable to receive a load of aggregate from an external source of supply, such as the truck T. The receiving hopper 42 is equipped with a roller 43 engageable with the wheels W of the truck T to facilitate a mobile engagement therewith in a manner described in greater detail below. The loading conveyor 40 is distinctly divided into an elevating portion 44 and a delivery portion 45 extending generally horizontally over the aggregate supply bins 14,16.

Figure 5:
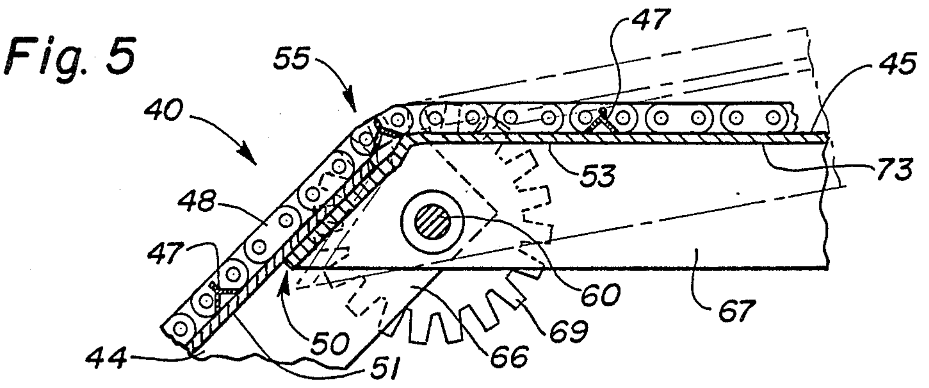
FIG. 5 is an enlarged partial cross-sectional view through the pivot shaft of the loading conveyor about which both the elevating portion and the delivery portion of the loading conveyor is pivotable to permit motion of the respective portions of the conveyor relative to the machine.

Referring also to the view of FIG. 5, it can be seen that the loading conveyor 40 is of a chain and slat construction with a plurality of transversely extending slats 47 extending between transversely spaced endless chains 48. The loading conveyor 40 is provided with a floor member 50 which is divided into a forward member 51 corresponding to the elevating portion 44 of the loading conveyor 40 and a rearward member 53 corresponding to the delivery portion 45 of the conveyor 40. The overlapping of the forward elevating flour member 51 and the rearward delivery floor member 53, which permits a continuous integrity of the floor member 50 whenever the respective portions 44,45 of the loading conveyor 40 are pivotally moved as described in greater detail below, is best seen in FIG. 5. In operation, the transverse slats 47, which can be oriented as shown in the drawings or in an orientation rotated about 90 degrees counterclockwise relative thereto so as to provide a cupped surface, engage material within the receiving hopper 42 and pass over the floor member 50 in operative association therewith to convey material from the receiving hopper 42 to the delivery portion 45. The endless loading conveyor 40 can also be divided into an upper delivery run 55 which passes over the floor member 50 in operative communication therewith and a lower return run 57 positioned beneath the floor member 50.

The receiving hopper 42 is integrally formed with the elevating portion 44 of the loading conveyor 40, which in turn is pivotally movable about the pivot shaft 60 forming a division between the elevating portion 44 and the delivery portion 45. The elevating portion 44 is pivotally movable in a generally vertical direction by the extensible hydraulic cylinder 62 interconnecting the frame 12 of the machine 10 and the elevating portion 44 of the conveyor 40. The pivotal movement of the elevating portion 44 permits the hopper 42 to follow changes in ground contours and to positionally match up with the truck T to facilitate the discharge and delivery of material from the truck T into the hopper 42. Similarly, the delivery portion 45 of the loading conveyor 40 is pivotally movable in a generally vertical direction by the hydraulic cylinder 64 which effects a pivotal rotation of the delivery portion 45 also about the pivot shaft 60. The vertical movement of the delivery portion 45 permits the piling of materials within the aggregate supply bins 14,16 to a level above the physical top of the supply bin 14,16 without becoming engaged with the delivery run 55 of the conveyor 40.

As best seen in FIG. 5, both the elevating portion 44 and the delivery portion 45 are provided with side frame members 66,67, respectively, which are journalled on the pivot shaft 60 to permit the pivotal movement of the portion 44,45. The pivot shaft 60 also carries a pair of sprockets 69 engaged with the endless chains 48 to permit a change in direction of the loading conveyor 40 from the elevating portion 44 onto the delivery portion 45. A tensioning sprocket 71, which may be springloaded and movable relative to the pivot shaft 60, engages the return run 57 of the conveyor 40 to take up the slack in the return run 57 while permitting the change in direction between the delivery portion 45 and the elevating portion 44 and permit the pivotal movement of the respective portions 44,45.

Referring now to FIGS. 1 and 2, the delivery portion floor member 53 is provided with a forward stationary section 73 and a linearly movable section 75 which is shiftable in a fore-and-aft direction by a pair of longitudinally extending hydraulic cylinders 76. When the movable section 75 is positioned in a rearward position, as best in the plan view of FIG. 1, an opening 78 is formed in the delivery portion floor member 53 over a rearward portion of the first aggregate supply bin 14. In this configuration, aggregate conveyed by the loading conveyor over the floor member 50 passes to the opening 78 and falls therethrough into the first aggregate supply bin 14. It should be noted by one skilled in the art that the aggregate passing through the opening 78 would pass through the return run 57 of the conveyor 40 and into the supply bin 14. When the level of aggregate discharged into the supply bin 14 is piled sufficiently high to reach the return run 57, which is moving in a forward direction, the return run 57 will be operable to engage the piled material and distribute it forwardly into the forward portions of the supply bin 14. In this manner, the supply of aggregate in the aggregate supply bin 14 can be replenished and substantially uniformly distributed throughout the supply bin 14.

The shifting movement of the hydraulic cylinder 76 is shown in FIGS. 1 and 2 in phantom and will affect a repositioning of the movable section 75 of the delivery portion floor member 53 in a forward position to close off the opening 78 over the supply bin 14 and open a discharge opening 79 along a rearward portion of the aggregate supply bin 16. In the same manner as described in the immediately preceding paragraph with respect to the filling of aggregate into the supply bin 14, the conveyor 40 conveys material from the hopper 42 along the floor member 50 from the elevating portion 44 to the delivery portion 45. The material is pushed by the transverse slats 47 over the stationary section 73 of the delivery portion floor member 53 and over the forwardly positioned movable section 75 to the discharge opening 79 over the aggregate supply bin 16.

Material passing through the opening 79 into the supply bin 16 must pass through the return run 57 of the conveyor 40 which is moving in a forward direction to permit a redistribution of material piled sufficient high to engage the return run 57 substantially uniformly throughout the supply bin 16. To further attain a uniform distribution of the aggregate loaded into either aggregate supply bin 14 or supply bin 16 and to further assure a substantial filling of the respective supply bin 14,16, the delivery portion 45 can be pivotally raised about the pivot shaft 60 by extension of the hydraulic cylinders 64. Such pivotal movement will permit the material to be piled somewhat higher within the respective supply bin 14,16 before being redistributed or during redistribution by the return run 57 of the conveyor 40.

As best seen in FIGS. 1 and 2, the concrete production machine 10 is formed in substantially a linear configuration. The supply bins 14,16 and 18 are located on the frame 12 in a linearly progressive fashion. Although the overall width of the machine 10 is limited to approximately 14 feet for transport over the highway system, the size of the respective bins 14,16,18 is sufficient to accept more than an entire truckload of aggregate and/or cement to permit a continuous operation of the machine in the production of concrete without running out of any of the component materials. The two aggregate supply bins 14,16 permit a storage of different aggregates, such as sand and a courser aggregate, which can be delivered into the bin by the loading conveyor 40. The cement supply bin 18 is of a size to accept a truckload of cement which is blown into the bin 18 through the access mechanism 19.

The machine 10 is equipped with forward and rearward operator stations 81,83, respectively to house the controls and the operator for the respective functions occurring at each end of the machine 10. The operator in the station 81 controls the loading operation of the loading conveyor 40, as well as the loading of cement and water into respective tanks 17,18. The operator in the rearward station 83 controls the delivery of concrete discharged from the mixing auger 3 through the discharge chute 37, as well as monitors the supply of component materials by the delivery conveyor mechanism 20 into the hopper 32 of the mixing mechanism 30 for the proper production of the desired type of concrete.

The concrete production machine 10, as described above, is operable to supply to a continuous production of concrete therefrom for deposit along the path of travel followed by the machine 10. So long as a supply of material is available within the respective bins 14,16,18 and the water tank 17, the delivery mechanism 20 will provide the desired quantities of aggregates and cement into the hopper 32 of the mixing mechanism 30 to be mixed with the water to produce concrete. The tracks 13 permit the machine 10 to be slowly advanced along a path of travel so that a concrete produced in the mixing auger 35 can be deposited rearwardly of the machine 10 within the path of travel in a continuous manner without interruption. One skilled in the art will readily realize that such a concrete production operation is particularly advantageous in situations where concrete is being placed as an overlay, for example on bridges or the like. The use of the loading conveyor 40 can replenish the supply of aggregates in the supply bins 14,16 on an alternating basis as needed to replenish the supply of aggregates therewithin while maintaining a continuous flow of aggregates into the delivery conveyor system 20.

Accordingly, the method of continuously producing concrete and depositing the concrete along a desired path rearwardly of the machine 10 involves a moving of the machine 10 along the path of travel over which the concrete is desired to be deposited, while producing concrete from the component materials stored on the machine 10 and depositing the concrete in the desired location rearwardly of other machine by the pivotally movable mixing auger 35 and discharge chute 37. Simultaneously with the moving of the machine 10 along the path of travel, fresh supplies of aggregates, cement or water, as needed, can be received into the respective supply bins 14,16,17,18 without having to stop the machine 10 to receive and load the fresh materials. The component materials can be withdrawn from their respective bins in desired quantities and at desired flow rates to produce concrete with the desired proportion of materials for discharge through the discharge chute 37 into the desired location.

Because the flow of aggregates from the bins 14,16 are expected to be at a substantially equal rate, the operator in the forward station 81 can receive alternating supplies of aggregates into the receiving hopper 42 and shift the movable section 75 of the delivery portion floor member 43 to form a discharge opening 78,79 over the desired bin 14,16 to maintain segregation of the respective aggregates, as well as a continuous supply thereof into the delivery conveyor mechanism 20. Moreover, because the supply vehicles for cement and water would not utilize the loading conveyor 40, fresh supplies of these materials can be taken on board the machine 10 generally simultaneously with the loading of aggregates into the supply bins 14,16.

It will be understood that changes in the details, materials, steps and arrangement of parts which have been described and illustrated to explain the nature of the invention will occur and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a mobile concrete mixing machine having a frame; means for mobilely supporting said frame for movement over the surface of the ground; first and second aggregate supply bins supported by said frame; a cement supply bin supported by said frame proximate to said aggregate supply bins; a water tank supported by said frame; mixing means for mixing aggregates, cement and water to produce concrete for discharge from said machine; and conveying means in operative communication with said aggregate supply bins, said cement supply bin and said water tank to convey controlled amounts of materials therefrom to said mixing means, the improvement comprising:

an endless loading conveyor in operative communication with both said first and second aggregate supply bins, said loading conveyor having a load receiving portion for accepting aggregate material from an external source of supply and a delivery portion selectively operable to deliver said aggregate material alternatively to one of said aggregate supply bins, said loading conveyor being operable to convey said aggregate material received by said load receiving portion to said delivery portion for the delivery of said aggregate material to the selected one of said aggregate supply bins, said loading conveyor further having a delivery run, a return run and a floor member disposed between said delivery and return runs and cooperable with said delivery run for the conveyance of said aggregate material over said floor member, said floor member including a movable section corresponding to the delivery portion of said loading conveyor and being slidably positionable over both said first and second aggregate supply bins by a linear actuator in first and second positions to create, respectively, first and second openings in said floor member above, respectively, said first and second aggregate supply bins.

2. The machine of claim 1 wherein said loading conveyor further has an elevating portion extending between said load receiving portion and said delivery portion.

3. The machine of claim 2 wherein said loading conveyor further includes a pivot shaft about which both said elevating portion and said delivery portion are pivotally movable.

4. The machine of claim 3 wherein said pivot shaft is generally horizontally disposed and said elevating portion and said delivery portion are movable in a generally vertical direction, said load receiving portion being movable with said elevating portion.

5. The machine of claim 4 wherein the material passing through both said first and second openings in said floor member positioned by said movable section also passes through said return run to enter the respective said aggregate supply bin, said return run being engageable with material piled in said aggregate supply bins to distribute said material within said aggregate supply bins during operation of said loading conveyor.

6. The machine of claim 5 wherein said loading conveyor is formed by a plurality of transverse slats connected to a pair of spaced apart endless chains, said slats being positioned above and cooperable with said floor member to convey material from said hopper to said delivery portion.

7. The machine of claim 6 wherein said elevating portion and said delivery portion are pivotally movable about said pivot shaft by respective linear actuators.

8. In a mobile concrete producing machine having a mobile frame adapted for movement over the ground; first and second aggregate supply bins supported by said frame; a cement supply bin supported by said frame proximate to said aggregate supply bins; a water tank supported by said frame; mixing means for mixing aggregates, cement and water to produce concrete for discharge from said machine; and conveying means in operative communication with said aggregate supply bins, said cement supply bin and said water tank to convey controlled amounts of materials therefrom to said mixing means, the improvement comprising:

a loading conveyor having a hopper for receiving a supply of material from an external source, a delivery portion positioned above said first and second aggregate supply bins and an elevating portion for conveying material from said hopper to said delivery portion, said delivery portion being selectively operable to deliver material to either one of said aggregate supply bins to the exclusion of the other said aggregate supply bin, said loading conveyor further having a transverse pivot shaft supported by said frame and spatially stationary relative thereto, said pivot shaft being operably associated with both said elevating portion and said delivery portion, said delivery portion being pivotally movable about said pivot shaft to effect an elevation of said delivery portion above said aggregate supply bins, said elevating portion being pivotally movable about said pivot shaft to effect a generally vertical movement of said hopper to facilitate the receipt therein of said aggregate material from varying configurations of external sources.

9. The machine of claim 8 wherein said loading conveyor includes an upper delivery run, a lower return run and a floor member disposed between said delivery and return runs for cooperation with said delivery run to effect a conveying of material from said hopper to said delivery portion.

10. The machine of claim 9 wherein said floor member within the delivery portion of said loading conveyor includes a movable section selectively shiftable to form a first opening over said first aggregate supply bin when said movable section is in a first position and to form a second opening over said second aggregate supply bin when said movable section is in a second position.

11. The machine of claim 10 wherein said movable section of said floor member, said elevating portion and said delivery portion are movable by extensible linear actuators pivotally supported by said frame.

12. The machine of claim 11 wherein said return run of said loading conveyor is operable to redistribute a pile of material within either of the respective said aggregate bins when said pile become sufficiently large to engage said return run.

13. The machine of claim 12 wherein said loading conveyor is formed by a plurality of transverse slats connected to transversely spaced apart endless chains, said slats being cooperable with said floor member to conveyor material therealong.

14. The machine of claim 8 wherein said hopper has a roller mounted thereon to engage said external source to urge movement thereof in conjunction with the forward movement of said machine so that said machine can receive fresh supplies of aggregate material while in motion to permit a continuous production of concrete by said machine.

15. The machine of claim 14 wherein said loading conveyor extends forwardly of said machine to engage trucks forming the external sources of material supply, said mixing means including a mixing auger projecting rearwardly from said machine and being pivotally supported from said mobile frame for transverse swinging movement for the discharge of concrete therefrom from side-to-side rearwardly of said machine, said aggregate supply bins being of sufficient size to hold a volume of material greater than the volume of material to be delivered by said trucks.

16. The machine of claim 1 wherein said conveying means comprises a first drag conveyor operably associated with one of said aggregate supply bins, a second drag conveyor operably associated with the other said aggregate supply bin and a third drag conveyor operably associated with said cement supply bin, each said drag conveyor discharging into said mixing auger, said aggregate supply bins and said cement supply bin being linearly disposed on said mobile frame, each said supply bin having sloped sides to facilitate the flow of material therewithin to the respective said drag conveyor.

17. The machine of claim 16 wherein said first and second drag conveyors are transversely spaced with said third drag conveyor being disposed therebetween, said third drag conveyor being associated with metering means to control the conveying of cement by said third conveyor to said mixing auger.

18. The machine of claim 17 wherein said drag conveyors discharge material therefrom into a receptacle defined by an annular ring about which said mixing auger is pivotally rotatable.

19. The machine of claim 18 wherein said drag conveyor is individually driven to permit the flow rates of material from the respective supply bins to be selectively varied to change the proportions of the materials used to produce the concrete.

* * * * *